United States Patent [19]

Wollschläger

[11] Patent Number: 5,399,083
[45] Date of Patent: Mar. 21, 1995

[54] MOLD CLOSURE SYSTEM FOR MACHINES PROCESSING PLASTICS MATERIALS

[75] Inventor: Dieter Wollschläger, Königswinter, Germany

[73] Assignee: Battenfeld Fischer Blasformtechnik GmbH, Troisdorf/Spich, Germany

[21] Appl. No.: 70,577

[22] Filed: Jun. 2, 1993

[30] Foreign Application Priority Data

Jun. 3, 1992 [DE] Germany .............. 42 18 261.1

[51] Int. Cl.⁶ .................................. B29C 37/00
[52] U.S. Cl. ........................ 425/450.1; 425/451.9; 425/541; 425/589
[58] Field of Search ............. 264/500, 523, 328.1; 425/450.1, 451.9, 541, 589

[56] References Cited

U.S. PATENT DOCUMENTS

| | | |
|---|---|---|
| 3,559,235 | 2/1971 | Hagen .................... 425/541 |
| 3,734,671 | 5/1973 | Talasz .................... 425/541 |
| 4,248,583 | 2/1981 | Hedke et al. ........... 425/451.9 |
| 4,392,802 | 7/1983 | Bortolotti et al. ..... 425/541 |
| 4,421,472 | 12/1983 | Martin, Jr. ............. 425/541 |
| 4,432,720 | 2/1984 | Wiatt et al. ............. 425/541 |
| 4,606,717 | 8/1986 | Polak et al. ............. 425/541 |
| 4,698,012 | 10/1987 | Shelby et al. ........... 425/541 |
| 4,859,170 | 8/1989 | Aoki ...................... 425/541 |
| 4,878,828 | 11/1989 | Wollschlager et al. .... 425/589 |

FOREIGN PATENT DOCUMENTS 2048258 10/1970 Germany .

Primary Examiner—Charles S. Bushey
Attorney, Agent, or Firm—Anderson Kill Olick & Oshinsky

[57] ABSTRACT

A mold closure system for machines processing plastics material, such as blow molding and injection molding machines, includes an essentially U-shaped pedestal having two legs and cross ties connecting them at one of their ends as well as two mold carriers and holding or supporting respectively one mold half, which are disposed between the two free legs of the pedestal 2 so as to be mobile against each other. When the molding tool is closed, the two mold carriers are provided with their abutments at the legs. A special guiding arrangement also is present for guiding the mold carriers parallel to one another to carry their weight. The guidance arrangement includes at least one guide beam or support, parallel to the direction of motion of the mold carrier, wherein the mold carrier are supported upon the guide beam or support to be longitudinally mobile.

7 Claims, 2 Drawing Sheets

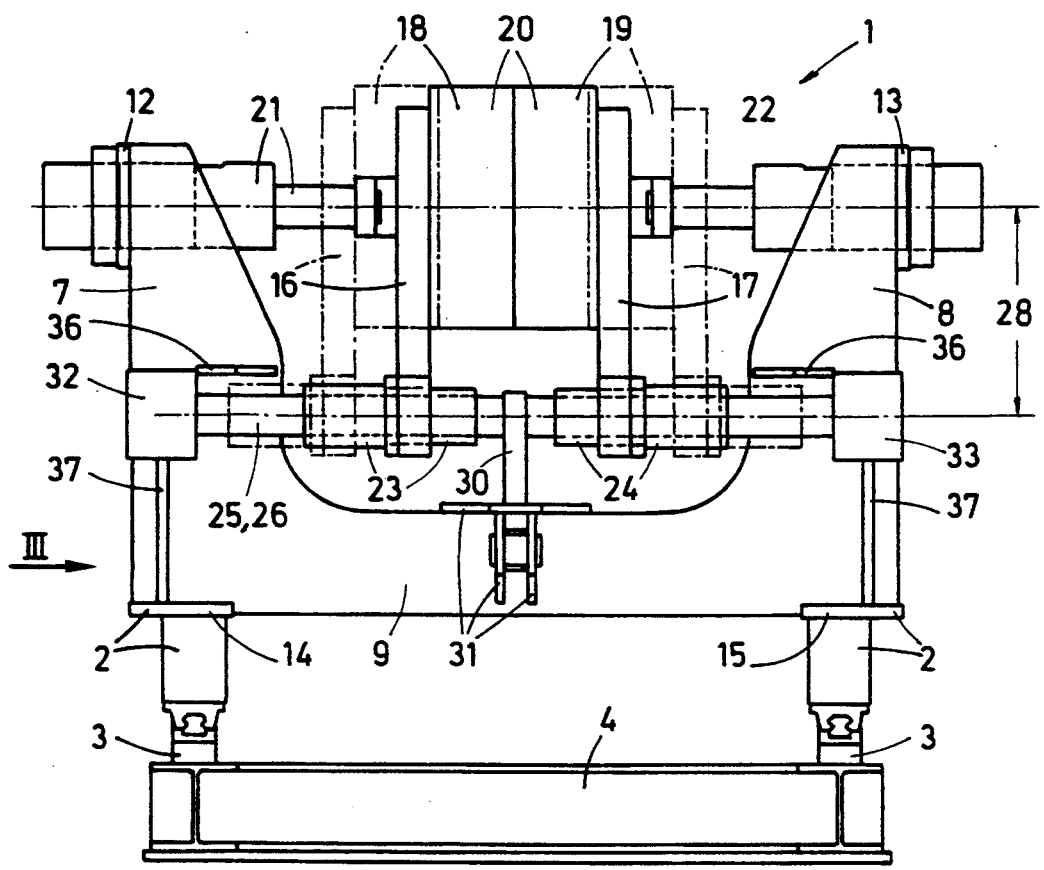
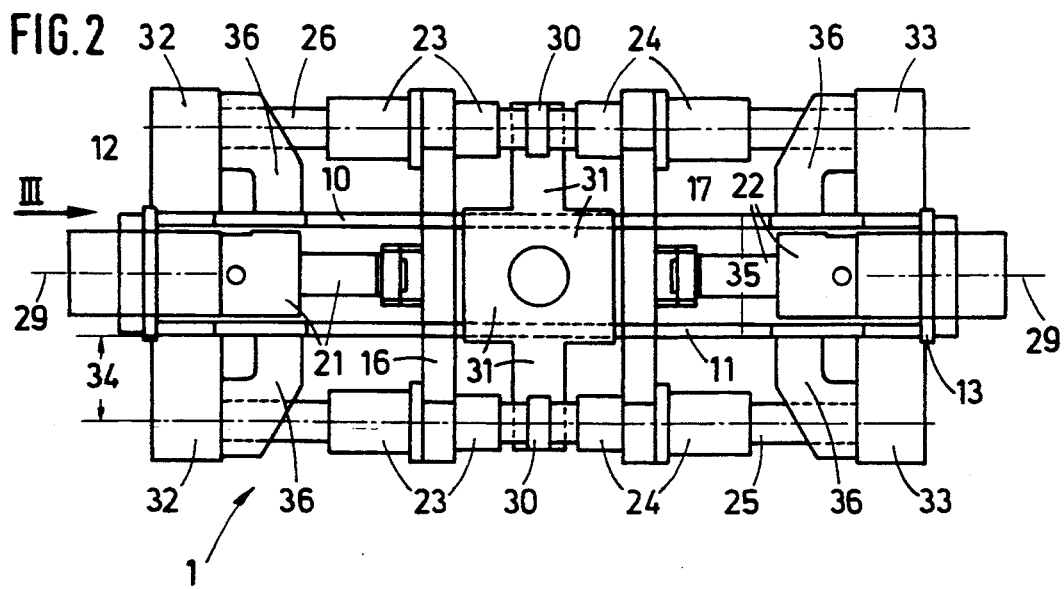

MOLD CLOSURE SYSTEM FOR MACHINES PROCESSING PLASTICS MATERIALS

FIELD OF THE INVENTION

The present invention is a directed to a mold closure system for machines processing plastics material, for instance, for blow molding and injection molding-machines.

BACKGROUND OF THE INVENTION

DE-PS 2048 258 discloses a mold closure system having a device for guiding mold supports parallel to each other and for carrying their weight and which is connected with a pedestal by an arrangement which leaves the guiding device largely unaffected by pedestal deformation.

Such a mold closure system has the advantages that the elastic deformations unavoidably occurring upon introduction of the closure forces into the mold supports cannot have any disadvantageous reaction on the cooperating mold halves because their mutual alignment or orientation is maintained by the uninfluenced guidance device. The elastic deformability of the essentially U-shaped pedestal must however remain within acceptable limits because of the relatively high design and construction expenses. In addition to a proper suspension of the nonaffectable guide carriers, stiffening measures must be taken for the pedestal, which results in a relatively high weight layout of the entire mold closure system.

It is therefore an object of the present invention to provide a mold closure system for machines processing plastic materials which has a lower design and construction expense.

Another object of the invention is to provide a mold closure system for machines processing plastic materials which have a lower design and construction expenses.

Still another object of the invention is to provide a mold closure system for machines processing plastic materials which has a reduced weight.

SUMMARY OF THE INVENTION

These and other objects of the invention, which shall become hereafter apparent, are achieved by the present mold closure system for machines processing plastics materials, such as blow molding and injection molding machines. The system comprises an essentially U-shaped pedestal having two legs and a cross-tie connecting the legs at their ends, two mold supports carrying respectively one mold half and displaceable relative to each other between the two legs of the pedestal and provided with abutments which engage each other during the closure process.

A specific guidance device is provided for guiding the mold supports, parallel to each other, as well as carrying their weight. The guidance device comprises at least one guide beam parallel, to the direction of movement of the mold supports, which are supported upon the guide beam for a displacement thereamong. The inventive design is light, yet is dimensionally in a simple construction and leave installation space for additional devices, without impairing its practical utility or serviceability.

According to the invention, tension stiffening struts are used as guide beams for the mold supports so as to be located above the cross tie, but below the mold supports abutments between the legs of the pedestal.

The invention has the advantage that the stiffening struts carrying the forces due to the weight of the mold halves, also being stressed in bending, prestresses the pedestal and thereby stiffens it to a considerable extent. The simultaneous use of the stiffening struts for support and/or guidance of the mold carriers results in an uncomplicated and therefore economical solution. Because of the small number of components required for building the mold closure system, an installation space for housing additional devices is obtained.

In a particular preferred embodiment, two stiffening struts, used as guide supports, are disposed symmetrically to the vertical longitudinal central plane of the pedestal. The stiffening struts in the pedestal below the mold support abutment are disposed at as small a spacing height as possible height to said mold carrier abutments. It must however be assured that the struts can travel with clearance past the article taken out of the mold during the conveyance motion.

This layout assures not only an optimum introduction of the closure forces into the molding tools, but also favors the accessibility to the entire mold closure system for an exchange of molding tools and creates space for devices to be disposed beneath the mold.

The functional mode of the mold closure system can be further optimized by arranging for resting the stiffening struts at approximately half their length on an additional support upon the tie rod of the pedestal. Herein, excessive deformation in bending of the stiffening struts under the effects of the weight forces of the molding tool is counter-acted.

Another advantageous design, according to the invention, consists in that the pedestal comprises two parallel cheeks connected in a rigid manner solely by transverse plates at the level of the mold carrier abutments at the legs as well as in the region of the lower edge of the crossbar.

In addition, the pedestal comprises cantilevered arms projecting into opposite sides from its legs, for instance, from the two cheeks. The stiffening struts engage at the cantilevered arms. This has been proved to be particularly significant. Herein, the stiffening struts can, for instance, have a fixed support at the cantilevered arms. In some cases, it can however be advantageous if the stiffening struts engage at the cantilever arms by articulated bearings.

Advantageously, according to the invention, the stiffening struts comprise round struts whose center distance from the adjacent external side of the pedestal corresponds approximately to the spacing between the outer sides of the pedestal.

This layout provides particularly high design strength and stability of the entire mold closure system. The design strength can be optimized by abutting each cantilevered plate by a horizontal and a vertical web plate against the leg of the pedestal carrying the cantilever arm and by providing the mold support abutments at the legs of the beam between the two cheeks.

BRIEF DESCRIPTION OF THE DRAWINGS

The invention will be better understood from the Detailed Description of the Preferred Embodiment, when read in connection with the drawings, of which:

FIG. 1 is a side view of a mold closure system for machines processing plastics material;

FIG. 2 is a plain view of the mold closure system shown in FIG. 1; and

DETAILED DESCRIPTION OF THE PREFERRED EMBODIMENT

Figure 3:
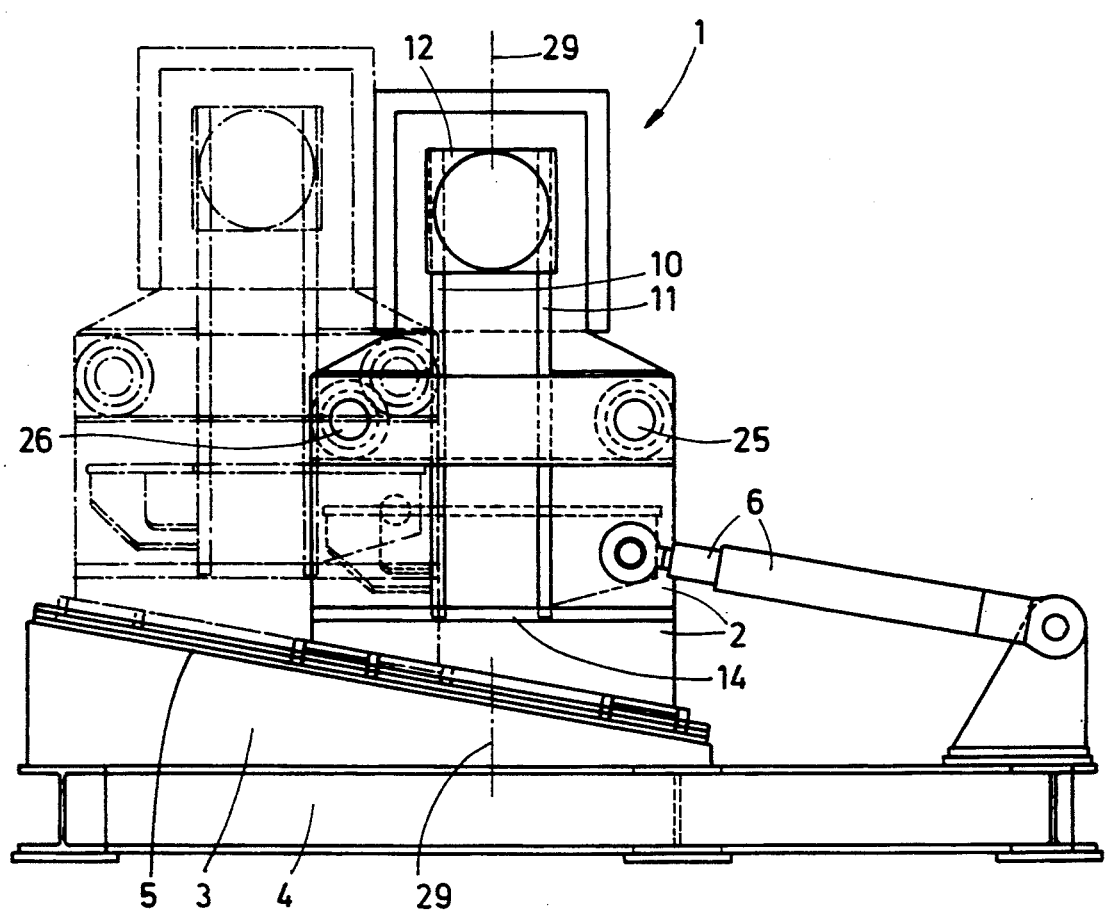
FIG. 3 is a front view of the mold closure system as shown in the direction of arrow II in FIGS. 1 and 2.

Referring now to the drawings, wherein like numerals designate like elements throughout the several views, a mold closure system 1 suitable for use in blow molding machines or also in injection molding machines is disclosed. The mold closure system 1 has a pedestal 2 resting upon struts 3 of a substructure 4, along which it is displaceable, for instance, upon an inclined track 5 into several different positions transversely to its longitudinal axis. As seen in FIG. 1, the pedestal 2, viewed from the side, has an essentially U-shaped form with two upright legs, which are rigidly connected with each other by a horizontal crossbar 9 to form a single piece. A pressure medium cylinder 6 can be used as a displacement drive for the pedestal 2. The cylinder is suspended at the substructure 4 and also engages at the pedestal 2 as shown in FIG. 3.

FIGS. 2 and 3 show the pedestal 2 comprising two parallel cheeks 10 and 11, which can be formed by relatively thick metal plate blanks. Both cheeks 10 and 11 are rigidly connected with each other at a parallel spacing merely in regions, namely near the free ends of their legs 7 and 8 by a transverse plate 12 or 13 and in the region of the lower edge of the crossbar 9 by transverse plates 14 and 15.

The mold closure system 2 is equipped with the two mold supports 16 and 17 between the two free legs 7 and 8 of the pedestal 2, wherein a mold half 18 or 19 of a molding tool 20 is installed on each of the mold supports 16 and 17.

A pressure medium drive 21, which has its abutment at the transverse plate 12 at the leg 7 of the pedestal 2, engages the mold support 16. A corresponding pressure medium agent drive 22 has its abutment in the transverse plate 13 at the leg 8 of the pedestal 2 and acts in an appropriate manner together with the mold support 17.

The mold supports 16 and 17 can be displaced in horizontal direction between the legs 7 and 8 of pedestal 2 by actuating the pressure medium drives 21 in order selectively to open and close the mold halves 18 and 19 of the molding tool 20.

In order to assure the necessary parallel movement of the two mold halves 18 and 19 of the molding tool 20, the mold supports 16 and 17 supporting the mold halves 18 and 19, are longitudinally displaceable upon the stiffening struts by, for instance, in guide sliding bushings 23 or 24. These stiffening struts 25 and 26 are installed as guide beams or supports, stressed essentially in tension between the two legs 7 and 8 of pedestal 2, and are preferably at a spacing 28 matched to the mold width between the force axis of the pressure medium drives 21 and 22 and the longitudinal axis of the stiffening struts 25 and 26.

The stiffening struts 25 and 26 are installed between the two legs 7 and 8 of the pedestal 2 to be essentially stressed in tension and are additionally stressed in bending by the forces from the weight of the mold supports 16 and 17 supported on them by the sliding bushings 23 or 24 and the mold halves 18 and 19. As seen in FIGS. 2 and 3, the stiffening struts 25 and 26 used as guide carriers are disposed symmetrically to the vertical longitudinal central plane 29-29 of the pedestal 2 or of the entire mold closure system 1. As also seen in FIGS. 1 and 2, the stiffening struts 25 and 26 rest approximately at half their length upon the crossbar 9 of pedestal 2 by an additional abutment 30 in order to counteract an excessive deformation in tension of the same under the effect of the forces from weight or gravity of the mold supports 16 and 17 as well as the molding tool 20.

The additional abutments 30 rest upon carrier consoles 31 which are seated on the crossbeam 9 of the pedestal 2 and project sideways across the cheeks 10 and 11 of the pedestal 2. The pedestal 2 has, at each of its two legs 7 and 8, cantilevered arms 32 and 33 projecting at opposite sides, for instance, from the two cheeks 10 and 11. The two stiffening struts 25 and 26 engage, at the cantilevered arms as can be seen particularly in FIGS. 1 and 2.

The stiffening struts 25 and 26 are fixedly connected to the cantilever arms 32 and 33. It is also possible to have the stiffening struts 25 and 26 engage by a bearing joint at the cantilever arms 32 and 33 without significantly changing the functional mode. The stiffening struts 25 and 26 comprise round struts (compare FIG. 3), having, e.g. a center distance 34 from the adjoining external side of the pedestal 2, which corresponds approximately to the spacing 35 between the two outer sides of the pedestal 2 (seen in FIG. 2).

Each cantilever arm 32 and 33 of a horizontal web plate 36 and a vertical web plate 37 is supported against the leg 7 or 8 of pedestal 2, carrying the cantilever arm or against the cheeks 10 and 11, to provide additional stability and support (see FIGS. 1 and 2).

Additionally, the guidance of the two mold carriers 16 and 17, along the stiffening struts 25 and 26, can be achieved not only by sliding bushes 23 and 24, but rolling bearing guides.

The invention is not limited to the use of mold closure systems, where pedestals 2 are guided to be transversely displaceable upon an inclined track 5 on the substructure 4.

It is essential for the mold closure system 1 for the stiffening struts 25 and 26, stressed in tension, to be inserted above the crosshead 9 of the pedestal 2 and beneath the mold carrier abutments between the legs 7 and 8 of the pedestal 2 as guide carriers. Forces that the gravity of the mold carriers and the molding tools resting thereon, to be linearly guided, subject the stiffening struts 25 and 26, stressed in tension in addition to bending, wherein the prestresses of the pedestal 2 is correspondingly increased.

While the preferred embodiment of the invention has been described in detail, modifications and adaptations may be made thereto without departing from the spirit and scope of the invention, as delineated in the following claims:

What is claimed is:

1. A mold closure apparatus for machines processing plastics materials, comprising:

a substantially U-shaped pedestal having two legs;

a cross-tie for connecting the two legs at one end thereof to form a one-piece member;

two molds supports for supporting two mold halves, respectively, wherein said mold supports are movable against each other between the two legs of the pedestal and are abutting against the two legs, respectively, during a closure process;

a guidance device for guiding the mold supports parallel to each other and for carrying their weight, wherein said guidance device comprises guide beam means, extending parallel to a direction of movement of the mold supports for supporting the mold supports for longitudinal displacement; and said guide beam means comprising tensioned stiffening struts supporting the mold supports and being arranged above the cross-tie and beneath mold support abutments of the pedestal, wherein the stiffening struts are disposed symmetrically to a vertical longitudinal center plan of the pedestal, wherein the stiffening struts are disposed in the pedestal beneath the mold support abutments at minimal height spacing from the mold support abutments, wherein there is provided an additional abutment for supporting the stiffening struts upon the cross-tie of the pedestal, approximately at half their length, wherein the pedestal comprises two parallel cheeks rigidly connected with each other by transverse plates arranged at a level of the mold support abutments of the legs and in a region of a lower edge of the cross-tie, and wherein the pedestal comprises cantilevered arms at its legs projecting at two opposite sides from the two cheeks, and the stiffening struts engage the cantilevered arms.

2. The mold closure apparatus of claim 1, wherein the stiffening struts are fixedly supported at the cantilevered arms.

3. The mold closure apparatus of claim 2, wherein the stiffening struts engage through articulated bearings at the cantilevered arms.

4. The mold closure apparatus of claim 3, wherein the stiffening struts engage at the cantilevered arms by a fixed support and through articulated bearings.

5. The mold closure apparatus of claim 4, wherein the stiffening struts comprise round struts which have a center distance from an adjacent outer side of the pedestal which corresponds approximately to a spacing between the two outer sides of the pedestal.

6. The mold closure apparatus of claim 5, wherein each cantilevered arm is additionally supported against the leg carrying the same by a horizontal web plate and a vertical web plate.

7. The mold closure apparatus of claim 6, wherein the mold carrier abutments are provided between the two cheeks at the legs of the pedestal.

* * * * *